(No Model.) 2 Sheets—Sheet 2.

A. C. McCORD.
CAR COUPLING.

No. 543,158. Patented July 23, 1895.

Witnesses:
F. M. Johnson
J. M. Pond

Inventor.
Alvin C. McCord,
By
Attys.

UNITED STATES PATENT OFFICE.

RICHARD FRANKLIN SCHROEDER, OF SACRAMENTO, CALIFORNIA.

CAN-FILLER FOR ICE-MACHINES.

SPECIFICATION forming part of Letters Patent No. 543,159, dated July 23, 1895.

Application filed April 5, 1895. Serial No. 544,648. (No model.)

*To all whom it may concern:*

Be it known that I, RICHARD FRANKLIN SCHROEDER, a citizen of the United States, residing at Sacramento, county of Sacramento, State of California, have invented an Improvement in Can-Fillers for Ice-Machines; and I hereby declare the following to be a full, clear, and exact description of the same.

My invention relates to a can-filling device which is especially adapted for use in conjunction with the cans in which water is frozen in ice-machines.

It consists in certain details of construction, which will be more fully explained by reference to the accompanying drawings, in which—

Figure 3:
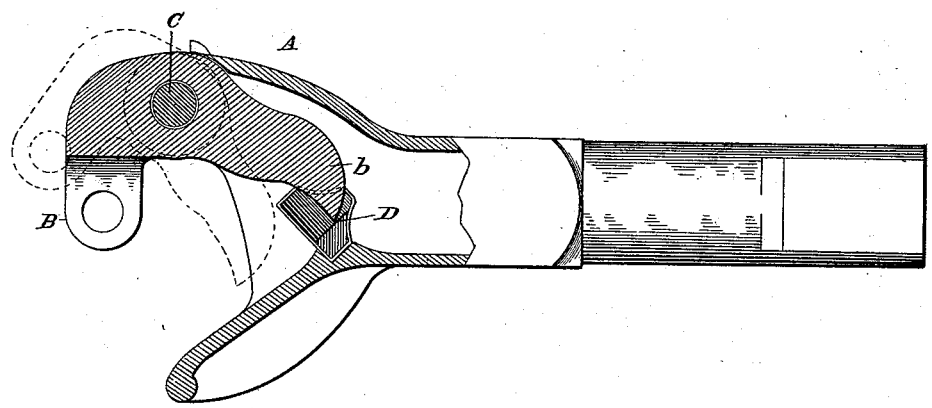
Figure 4:
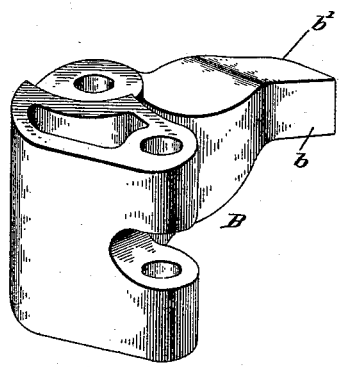
Figure 5:
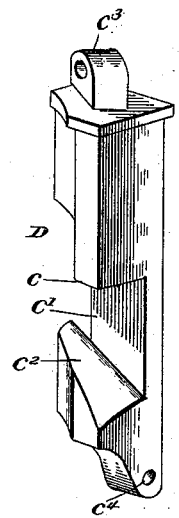
Figure 6:
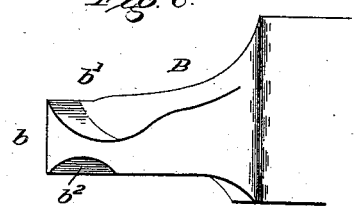

Figure 1 is a vertical section taken through $x\ y$ of Fig. 3. Fig. 2 is a similar section taken through $w\ z$ of Fig. 3. Fig. 3 is a plan view showing the float and upper spider.

D is a can of the form employed for freezing ice in independent blocks.

C is a frame or spider made of open bars and of such form as to approximately fit in the bottom of the can, upon the bottom of which it normally rests. In the center of this spider is a chamber containing a valve $m'$, which valve has a stem $m$ projecting downwardly through the bottom of the spider and extending a little below it when the valve is closed. In the upper end of the hub, above the valve, screw-threads are formed, into which the lower end of the pipe P is secured. The upper end of this pipe has a connecting-pipe E, by which it is supplied with water from the purifying and filtering apparatus, and a cut-off cock or valve which may be closed at will.

Upon the pipe P and near the top of the can is a spider B similar to the one shown at C, and this is secured to the pipe by a set-screw $s$ or by other similar suitable means.

A is a float made of the shape of the interior of the can and fitting the same as closely as possible while allowing it to move freely up and down. An opening A' is made through the center of the float which, fits loosely around the pipe P, and a second opening A² is made a short distance therefrom, through which the guide-rod G extends, this rod being fixed at top and bottom to the spiders B and C respectively. This guide-rod keeps the float in its proper position as it rises and falls and prevents its turning so as to create friction against the sides. The lower part of the float is chambered at the center, so that it may fit down over the hub of the spider C when the can is empty and the float is at the bottom, and may also be chambered to fit over the spider to get it close to the bottom. In order to allow the float to sink freely to the bottom and not be buoyed up or stopped by the air beneath it when being introduced into an empty can I have shown tubes I extending through the float, and having in them check-valves $n$, which open upwardly to allow the air to pass when the float is sinking to the bottom.

The operation of the device will then be as follows: Water from the purifying and filtering apparatus (not here shown) is admitted through the pipe E, and, passing down through the pipe P, will enter the valve-chamber. The spider C resting upon the bottom of the can, the length of the valve-stem $m$ is such that its lower end rests upon the bottom of the can and the valve is thus lifted from its seat, leaving sufficient space for the water which enters through the pipe P to pass down through the valve-chamber and below the spider. Thence it rises within the can, and as it rises it lifts the float A, which moves freely upward by reason of its loose fit around the pipe P and the guide-rod G, until the float strikes the bottom of the spider B. Then as the water continues to rise within the can the float lifts the spider B, and with it the pipe P and the spider C until the valve-stem $m$ is free from the bottom of the can. This allows the valve $m'$ to be closed, and further supply of water to the can is cut off. Considerable difficulty is experienced in preventing a reabsorption of air into the water after the latter has been boiled or heated to drive the air out when it is prepared for freezing. I am enabled to prevent any appreciable amount of air from being absorbed by the water while the can is being filled by reason of the closely-fitting float A, which covers and protects the surface of the water and prevents any access of air thereto. As soon as the can is filled the spiders, float, and connecting parts, with the filling-pipe, are transferred to of the heel-piece it, turning upon its pivot-pin or fulcrum C, sweeps through the cavity or recess c' of the locking-pin, and after the heel-piece has thus been positively moved in front of the forward surface of the vertically-moving locking-pin the latter is free to fall, and does fall, by gravity, it being then in readiness to be again lifted in the coupling action, as hereinbefore explained. By this construction the knuckle is locked and also positively thrown to its open position by one locking-pin having a vertical movement, the positive ejectment of the knuckle being, as is believed, effected in a manner heretofore unknown—i. e., by a pin standing vertically and having only a vertical movement. This arrangement not only greatly simplifies and cheapens the construction, but offers even greater advantages in locating the locking-pin in a manner best calculated to withstand strain and shock. The simple vertical movement of the locking-pin also reduces the removal of metal from the coupler-head to the minimum, leaving the head strong and solid where subject to great concussive and pulling strain.

The entire construction is such that the strain is properly and equally distributed and the buffing force so met as to relieve the fulcrum or pivot-pin and other parts of the coupler from undue shock. Care is exercised to give the proper distribution of metal between the coupler-head and the coupling hook or knuckle and to provide uniform wearing-surface between said knuckle and the locking device.

The action is, as has been pointed out, strictly automatic, and the simplicity and effectiveness of the locking and knuckle unlocking and ejecting device have been fully demonstrated.

There are other features entering into my improved coupler such as those designed to transfer the strain from the fulcrum or pivot-pin to the coupler-head; but these, not forming part of my present invention, are not here particularly described.

While my invention is here described and shown as applicable to what is known as the "Janney type" of coupler, it is apparent that it may be employed in any coupler embodying a coupling hook or knuckle adapted to be locked by a locking-pin and positively thrown forward or ejected by the raising of the said pin in a vertical line.

Having described my invention, I claim—

1. In an automatic car coupler, the combination of a coupler head, a coupling hook or knuckle provided with suitable upper and lower bearing surfaces, and a vertically moving locking pin having a shoulder adapted to be engaged by the upper bearing surface of the hook or knuckle, and an inclined or rounded surface adapted to engage the lower bearing surface of said coupling hook or knuckle, substantially as set forth.

2. An automatic car coupler, a coupler head, and a coupling hook or knuckle having an extension or heel piece provided with suitable upper and lower bearing surfaces, combined with a vertically moving locking pin having a shoulder adapted to be engaged by the upper bearing surface of the heel piece, and a lower inclined or rounded surface adapted to engage the lower bearing surface of the said heel piece, substantially as set forth.

3. In an automatic car coupler, the combination of a coupler head, a coupling hook or knuckle having an extension or heel piece provided with suitable upper and lower bearing surfaces, and a vertically moving locking pin provided with a shoulder adapting it to be lifted by an inward pivotal movement of said heel piece and having a lower inclined or rounded surface adapted, when the pin is vertically lifted, to engage the lower bearing surface of said heel piece and positively throw the coupling hook or knuckle forward to the uncoupling position, substantially as set forth.

4. In a car coupler, a sliding locking pin, having a projection, to be engaged and lifted by means of a coupling hook or knuckle, and a projection inclined on its top face to engage and move the said coupling hook or knuckle, in combination with a coupler head and a coupling hook or knuckle pivoted thereto, substantially as and for the purposes stated.

In testimony whereof I hereto set my hand.

ALVIN C. McCORD.

Witnesses:
D. W. McCORD,
GEORGE A. HAMILTON.